(12) United States Patent
Gryaznov et al.

(10) Patent No.: US 10,580,537 B2
(45) Date of Patent: Mar. 3, 2020

(54) METHOD OF SEALING NUCLEAR REACTOR FUEL ELEMENTS HAVING A CASING MADE OF FERRITE-MARTENSITE STEEL

(71) Applicant: STATE ATOMIC ENERGY CORPORATION "ROSATOM" ON BEHALF OF THE RUSSIAN FEDERATION, Moscow (RU)

(72) Inventors: Nikolaj Serafimovich Gryaznov, Moscow (RU); Oleg Anatolevich Kruglov, Moscow (RU); Mariya Vladimirovna Leonteva-Smirnova, Moscow (RU); Irina Aleksandrovna Naumenko, Moscow (RU); Mikhail Vladimirovich Skupov, Moscow (RU); Viktor Pavlovich Smirnov, Moscow (RU); Yurij Vasilevich Sorokin, Moscow (RU)

(73) Assignee: State Atomic Energy Corporation "Rosatom" On Behalf of the Russian Federation (RU)

( * ) Notice: Subject to any disclaimer, the term of this patent is extended or adjusted under 35 U.S.C. 154(b) by 4 days.

(21) Appl. No.: 16/069,874

(22) PCT Filed: Nov. 23, 2016

(86) PCT No.: PCT/RU2016/000808
§ 371 (c)(1),
(2) Date: Jul. 12, 2018

(87) PCT Pub. No.: WO2017/091111
PCT Pub. Date: Jun. 1, 2017

(65) Prior Publication Data
US 2019/0019586 A1    Jan. 17, 2019

(30) Foreign Application Priority Data

Nov. 26, 2015  (RU) .................... 2015150743

(51) Int. Cl.
*G21C 3/07*         (2006.01)
*G21C 21/02*        (2006.01)
(Continued)

(52) U.S. Cl.
CPC ............... *G21C 3/07* (2013.01); *B23K 9/028* (2013.01); *B23K 9/164* (2013.01); *G21C 3/10* (2013.01);
(Continued)

(58) Field of Classification Search
CPC . G21C 3/07; G21C 3/10; G21C 21/02; B23K 9/028; B23K 9/164
(Continued)

(56) References Cited

U.S. PATENT DOCUMENTS 3,460,236 A * 8/1969 Shoudy .................. G21C 21/02
                                                    376/418
4,865,804 A * 9/1989 McGeary ................. G21C 3/10
                                                    376/451
(Continued)

FOREIGN PATENT DOCUMENTS

JP    H05180986     *  7/1993
KR    20010060802   *  7/2001
(Continued)

*Primary Examiner* — Jack W Keith
*Assistant Examiner* — Daniel Wasil
(74) *Attorney, Agent, or Firm* — Eric L. Sophir; Dentons US LLP

(57) ABSTRACT

The invention relates to nuclear power and can be used in manufacturing of fuel elements for nuclear reactors. A method of sealing nuclear reactor fuel elements is proposed comprising welding one end of a casing with a first plug, loading the fuel element with fuel, and welding a second (Continued)

plug to another end of the casing. The casing is of a high-chromium ferrite-martensite steel and the plugs are of a ferrite steel. Argon arc welding is carried out at a volume ratio of the materials of the casing and the plugs contributing to formation of the metal of the weld seam which allows formation of a ferrite phase in said metal, wherein the ratio is: $V_1/V_2 \geq 0.18$, where $V_1$ is the volume of ferrite material and $V_2$ is the volume of ferrite-martensite material. Argon arc welding is carried out at a current of 14-20 A, a speed of 12-15 m/h, an arc voltage of 9-10 V and an argon flow rate of 7-8 l/min. This method provides for the desired quality of the welded joins and simplifies the fuel element manufacturing process.

2 Claims, 1 Drawing Sheet

(51) Int. Cl.
    *B23K 9/028*     (2006.01)
    *B23K 9/16*     (2006.01)
    *G21C 3/10*     (2006.01)
    *B23K 103/04*     (2006.01)
    *B23K 101/14*     (2006.01)

(52) U.S. Cl.
    CPC ........... *G21C 21/02* (2013.01); *B23K 2101/14* (2018.08); *B23K 2103/04* (2018.08); *Y02E 30/40* (2013.01)

(58) Field of Classification Search
    USPC .................................................. 376/451, 457
    See application file for complete search history.

(56) References Cited

U.S. PATENT DOCUMENTS

| | | | |
|---|---|---|---|
| 6,103,996 A * | 8/2000 | Yoneda | B23K 9/0286 |
| | | | 219/61 |
| 2003/0016777 A1* | 1/2003 | Vandergheynst | G21C 3/10 |
| | | | 376/451 |
| 2014/0023432 A1* | 1/2014 | Matsuhashi | B23K 9/025 |
| | | | 403/272 |
| 2014/0254736 A1* | 9/2014 | Hertz | G21C 21/18 |
| | | | 376/241 |

FOREIGN PATENT DOCUMENTS

| | | |
|---|---|---|
| KR | 20130123463 A | 11/2013 |
| RU | 2302044 C1 | 6/2007 |

* cited by examiner

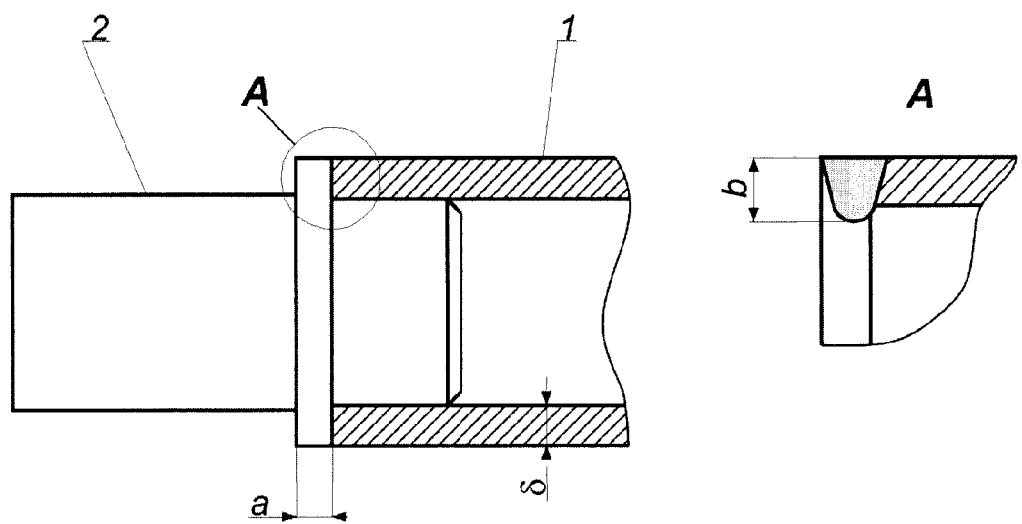

METHOD OF SEALING NUCLEAR REACTOR FUEL ELEMENTS HAVING A CASING MADE OF FERRITE-MARTENSITE STEEL

CROSS-REFERENCE TO RELATED APPLICATIONS

This application is a National Stage of PCT/RU2016/000808, filed Nov. 23, 2016 that claims the priority of Russian Patent Application No. 2015150743, filed on Nov. 26, 2015, which are incorporated herein by reference in their entirety for all purposes.

TECHNICAL FIELD

The invention relates to nuclear power and can be used in the manufacture of fuel elements for power reactors.

BACKGROUND

There is a known method for sealing fuel elements, wherein the welding is carried out by melting the casing end together with the plug using the non-consumable electrode in the atmosphere of shielding gases (U.S. Pat. No. 3,045,108).

The disadvantage of the method is in that the arc is ignited by the contact between the electrode and the cylindrical projection of the plug, wherein tungsten inclusions get into the weld pool which can reduce the strength and, correspondingly, the quality of a welding joint.

The other known method of sealing fuel elements by fusion welding comprises welding the plug made of the same material as the fuel element casing to one end of the casing made of 1X18H10T (1Cr18Ni10Ti) stainless steel; fuel loading followed by welding the second plug to another end of the casing, thereby tightly sealing the fuel element containing the fuel (see the book: authors A. G. Samoylov, V. S. Volkov, M. I. Solonin "Fuel elements of nuclear reactors", Moscow, Atomenergoizdat, 1996, analog). This method discloses all the essential technological operations which are required to seal fuel elements, wherein an oscillator is used to ignite an arc.

In recent years, in view of the higher standards for performance characteristics of fuel elements of fast-neutron reactors (such as the radiation dose, coolant corrosive-erosive effect and temperature), high-chromium ferrite-martensite steels of the following grades: EI-852, EP-823, EP-900 are used in manufacturing of fuel elements casings.

The closest analog is the method of sealing fuel elements with the casing made of high-chromium steel, which comprises welding the plug made of the same material as the fuel element casing to one end of the casing, fuel loading followed by welding the second plug to the other end of the casing to form the weld joint assembly, and finally tempering the weld joints to remove quenching structures therefrom (see the book "Development, production and operation of fuel elements of power reactors" edited by Ph. G. Reshetnikov, vol. 2, Energatomizdat, 1995r, prototype).

The main disadvantage of such method of welding the steels of this grade is a tendency to form quenching structures and cold cracking after a certain period of time upon completion of the welding in these steels.

A drawback of the method is that an additional operation is required for producing high-quality weld joints for such steels, in particular, the weld joint tempering which is carried out at 740-760° C. for 20-30 min, keeping the time between welding operations and the subsequent tempering as short as possible. This operation carried out after tempering the weld seam is costly and increases complexity of the technology of fuel element manufacturing, especially when tempering the weld joint which seals the fuel element loaded with fuel.

SUMMARY

The technical effect of the present invention is an increase in the durability of the sealing of nuclear reactor fuel elements with casings of high-chromium steels by means of providing a high-quality welded joint between a casing and a plug without subsequent heat treatment of the weld seam, which simplifies the manufacturing process.

BRIEF DESCRIPTION OF THE DRAWINGS

FIG. 1 illustrates the structure of the weld joint assembly.

DETAILED DESCRIPTION

This technical effect is provided by the method of sealing nuclear reactor fuel elements, comprising welding one end of the casing to the plug, both of high-chromium steel, loading the fuel element with fuel, and welding a second plug to another end of the casing, wherein the casing is of a high-chromium ferrite-martensite steel and the plug is of a high-chromium ferrite steel, wherein the argon arc welding is carried out at a volume ratio of the materials of the casing and the plug contributing to the formation of the metal of the weld seam which allows formation of a ferrite phase in said metal, wherein the ratio is:

$$V_1/V_2 \geq 0.18,$$

where $V_1$ is the volume of ferrite material;
$V_2$ is the volume of ferrite-martensite material.

Argon arc welding is carried out at a current of 14-20 A, a speed of 12-15 m/h, an arc voltage of 9-10 V and an argon flow rate of 7-8 l/min.

The volume ratio of ferrite and ferrite-martensite materials in the weld joint metal, which is ≥0.18, is based on the fact that a stable ferrite phase is formed at values higher or equal to the designated value in the joint melt zone, and the ferrite phase not tending to the cold cracking and not requiring tempering of the weld joint; at lower values the desired ferrite phase is not formed, making necessary the heat treatment of the weld joint metal.

The FIGURE illustrates the structure of the weld joint assembly which includes a casing 1 comprised of ferrite-martensite steel and a plug 2 comprised of ferrite steel.

EXAMPLE

The method of sealing nuclear reactor fuel elements comprises welding one end of a casing to a plug, both comprised of high-chromium steel, loading the fuel element with fuel, and welding a second plug to another end of the casing.

Modeling the welding process at different process variables, such as a shoulder width a, a casing thickness δ, and a predetermined penetration depth b, was carried out on a geometrically flat model of the weld joint assembly before and after welding, followed by determining the phases formed in the weld joint by means of structural analysis, which allows calculating ratio of the areas of steels of various grades participating in forming the joint metal, to obtain the ferrite phase therein.

The resulting surface areas of materials of various grade were determined in slices of weld joints taking into account their fractions in the formed joint metal and was conducted by means of the computer program JpSquare (LProSoft), and the phase formed in the weld joint metal was determined by structural analysis. The volume of the phase formed in the joint metal was proportional to the area of the metal in the geometrical flat model of the weld joint assembly. The ratio of material volumes for the casing and the plug required to form the ferrite phase in the joint metal is determined on the basis of the calculated area of the materials to be coupled.

$$V_1/V_2 \geq 0.18,$$

where: $V_1$ is the volume of ferrite material;
$V_2$ is the volume of ferrite-martensite material.

The method of sealing is carried out by argon-arc welding with the use of a casing made of ferrite-martensite steel of the EP-823 grade with a diameter of 9.3 mm having a wall thickness of 0.5 mm.

Ferrite steel of 05Х18С2ВФАЮ (05Cr18Si2WVNAI) grade was used for the plug, the shoulder width was 0.8 mm, its diameter corresponded to the casing diameter (see FIGURE).

The chemical composition of steels used for welding is shown in Table 1.

TABLE 1

Chemical composition of the welded materials.

| Steel | Cr | Si | W | Nb | Wo | V | Mn | Al | Ni | N | C | Ce |
|---|---|---|---|---|---|---|---|---|---|---|---|---|
| EP-823 | 10-12 | 1.1-1.3 | 0.3 | 0.3 | 0.6-0.9 | 0.2-0.4 | 0.5-0.8 | — | 0.5-0.8 | ≤0.05 | 0.14-0.18 | — |
| 05Х18С2МВФАЮ (05Cr18Si2MoWVNAl) | 18.0 | 1.7 | 0.6 | 0.2 | 0.7 | | 0.3 | 0.1 | 0.2 | — | 0.04 | — | 0.01 |

Mechanical characteristics of the steels are shown in Table 2.

TABLE 2

Mechanical characteristics of the welded material

| | Mechanical characteristics at 2° C. | | | Mechanical characteristics at 650° C. | | |
|---|---|---|---|---|---|---|
| Steel | $\sigma_V$, MPa | $\sigma_{0.2}$, MPa | δ, % | $\sigma_V$, MPa | $\sigma_{0.2}$, MPa | δ, % |
| EP-823 | 829 | 672 | 20 | 294 | 265 | 48 |
| 05Х18С2МВФАЮ (05Cr18Si2MoWVNAl) | 600 | 482 | 9 | 200 | 186 | 40 |

The conducted experiments with the steel 05х18С2МВФАЮ (05Cr18Si2MoWVNAI) demonstrated its high mechanical performance and perspective corrosion resistance in lead coolant (RU Patent 2238345 "Steel for core fuel elements of lead-coolant nuclear reactors"/Velyuhanov V. P., Zelenskiy G. K., Ioltuhovskiy A. G., Leontieva-Smirnova M. V., Mitin V. S., Sokolov N. B., Rusanov A. E., Troyanov V. M.; the applicant and the patent holder— Russian Federation represented by Federal Agency on Atomic Energy, SSC VNIINM.; publ. Dec. 20, 2004.)

The mode of welding the casing made of steel EP-823 with the plug made of steel 05Х18С2МВФАЮ (05Cr18Si2MoWVNAI):
welding current 15 A,
welding velocity 14 m/h,
arc voltage 9 V,
argon rate 8 l/min.

Following the technology described above, fuel element simulators were made.

Metallographic researches of the weld joints for selected welding modes have shown that the volume ratios of the ferrite phase to the ferrite-martensite phase is from 0.46 to 0.51.

Mechanical strength tests have shown that the rupture of the samples occurs across the casing of fuel element simulators. Strength limit of the casing is 818 MPa.

Weld joints have been tested for corrosion in lead coolant for 4000 hours. It has been found that the corrosion resistance of weld joints remains at the level of corrosion resistance of the fuel casing.

The tests of the weld joints for gas-tightness carried out using a helium leak detector by a mass spectroscopic method at a room temperature have shown that all joints are hermetically sealed.

The use of the inventive method of sealing fuel elements having a casing made of high-chromium steel allows to improve the quality of the weld joint between the casing and the plug and to greatly simplify sealing technology.

What is claimed is:

1. A method of sealing nuclear reactor fuel elements, comprising welding one end of a casing comprised of ferrite-martensite steel to a first plug, loading the casing of the fuel element with fuel, and then welding a second plug to another end of the casing, wherein both the first plug and the second plug are comprised of ferrite steel, and argon arc welding of the casing with the first plug and the second plug is carried out at a volume ratio of the material of the casing and the material of the first plug and the second plug contributing to the formation of the metal of the weld seam which allows formation of a ferrite phase in said metal, wherein the ratio is:

$$V1/V2 \geq 0.18,$$

where: V1 is the volume of ferrite material;
V2 is the volume of ferrite-martensite material.

2. The method of claim 1, characterized in that the argon arc welding is carried out at a current of 14-20 A, a speed of 12-15 m/h, an arc voltage of 9-10 V and an argon flow rate of 7-8 l/min.

* * * * *